(12) United States Patent
Dadkhah Tehrani et al.

(10) Patent No.: US 12,283,193 B2
(45) Date of Patent: Apr. 22, 2025

(54) HELICOPTER OBSTACLE AVOIDANCE WITH SLUNG LOAD

(71) Applicant: LOCKHEED MARTIN CORPORATION, Bethesda, MD (US)

(72) Inventors: Navid Dadkhah Tehrani, Providence, RI (US); Sean S. Carlson, New Milford, CT (US); Cauvin Polycarpe, Middletown, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 218 days.

(21) Appl. No.: 17/944,040

(22) Filed: Sep. 13, 2022

(65) Prior Publication Data

US 2024/0087464 A1   Mar. 14, 2024

(51) Int. Cl.
| | |
|---|---|
| *G08G 5/04* | (2006.01) |
| *B64C 27/04* | (2006.01) |
| *B64C 39/02* | (2023.01) |
| *B64D 47/00* | (2006.01) |
| *G05D 1/00* | (2006.01) |
| *G05D 1/10* | (2006.01) |
| *B64U 101/60* | (2023.01) |

(52) U.S. Cl.
CPC ............. *G08G 5/045* (2013.01); *B64C 27/04* (2013.01); *B64C 39/024* (2013.01); *B64D 47/00* (2013.01); *G05D 1/106* (2019.05); *B64U 2101/60* (2023.01)

(58) Field of Classification Search
CPC .... G08G 5/045; G08G 5/0013; G08G 5/0021; G08G 5/0026; G08G 5/0034; G08G 5/0069; G08G 5/0086; G08G 5/0091; B64C 27/04; B64C 39/024; B64D 47/00; G05D 1/106; G05D 2107/30; G05D 1/242; G05D 2105/28; G05D 2109/25; G05D 2111/10; G05D 1/246; G05D 1/606; G05D 1/622; G05D 1/672; B64U 2101/60

See application file for complete search history.

(56) References Cited

U.S. PATENT DOCUMENTS

| | | | |
|---|---|---|---|
| 8,622,336 B2 | 1/2014 | Brenner et al. | |
| 9,879,986 B2 * | 1/2018 | Carlson | .................. B64C 17/00 |
| 10,676,193 B2 | 6/2020 | Lesperance et al. | |
| 2020/0294406 A1 * | 9/2020 | Cellerier | .............. G08G 5/0086 |
| 2020/0369492 A1 * | 11/2020 | Sikora | ...................... G05D 1/10 |
| 2021/0173415 A1 * | 6/2021 | Cajias | .................... G06V 20/64 |

OTHER PUBLICATIONS

Villa, D.K.D., Brandão, A.S. & Sarcinelli-Filho, M. A Survey on Load Transportation Using Multirotor UAVs. J Intell Robot Syst 98, 267-296 (2020). https://doi.org/10.1007/s10846-019-01088-w.*
Peter H. Tyson, "Simulation Validation and Flight Prediction of UH-60A Black Hawk Helicopter/Slung Load Characteristics", Naval Postgraduate School, Mar. 1, 1999 (2 pages).

* cited by examiner

*Primary Examiner* — Brian P Sweeney
(74) *Attorney, Agent, or Firm* — Foley & Lardner LLP

(57) ABSTRACT

Load volume predication for slung loads of aerial vehicles are disclosed. A system can identify parameters of a load. The system can determine a volume occupied by a superposition of locations of the cone. The system can receive from sensors or models, characteristics of an environment associated with the aerial vehicle or the load. The system can detect an obstacle in the environment. The system can take a navigational action in response to detecting the obstacle.

20 Claims, 10 Drawing Sheets

HELICOPTER OBSTACLE AVOIDANCE WITH SLUNG LOAD

FIELD OF THE DISCLOSURE

This disclosure relates to sensor based navigation of aerial vehicles.

BACKGROUND

Aerial vehicles, such as helicopters, can carry loads in proximity to one or more obstacles. However, it can be challenging to avoid obstacles when carrying the load in one or more circumstances.

SUMMARY

This technical solution is directed to helicopter obstacle avoidance with slung loads. For example, the technical solution can include techniques for predicting a volume occupied by a slung load of an aerial vehicle, and interactions between the volume and an environment. A data processing system of or associated with an aerial vehicle can receive parameters of a slung load of the with the aerial vehicle. From the altitude parameters of the slung load, the data processing system can predict a volume the slung load can occupies (e.g., a cone). The data processing system can predict the volume based on data sensed by the aerial vehicle with the slung load, another aerial vehicle, or based on global data (such as a weather forecast). The volume occupied by the slung load can be interfaced with an environment, such as a terrain map disposed along a route of the aerial vehicle.

The route can be defined, for example, based on the volume occupied by the load. For example a route can be defined that minimized aerial vehicle altitude, transit time, or fuel usage based on the load volume and terrain or other environmental information. The route can be defined based on a world model, such as terrain maps, altitudes, or weather forecasts, or can be based on sensor data collected by sensors of the aerial vehicle. The route can define a path between an origin and a destination. For example, the route can define a path between a liftoff point of the aerial vehicle, and a landing point of the aerial vehicle, or a first position of the aerial vehicle proximate an obstacle, and a second position of the aerial vehicle proximate an obstacle (e.g., in the case of an obstacle avoidance system). The obstacle can be detected by sensors of the aerial vehicle or communicatively coupled therewith. The data processing system can iteratively define routes based on sensed data while traversing the route or world model. For example, an initial route can be modified in response to a detected obstacle.

An aspect of the present disclosure can relate to a system. The system can include one or more processors coupled to memory. The system can predict a volume to be occupied by a load slung from an aerial vehicle. The prediction can be based on one or more parameters of the load. The system can establish a route from a first location to a second location configured to avoid a collision between one or more obstacles in the terrain and the load slung from the aerial vehicle. The route can be based on a map of terrain and the volume predicted to be occupied by the load. The system can execute an action to navigate the aerial vehicle along the route to avoid the collision between the one or more obstacles in the terrain and the load slung from the aerial vehicle.

In some implementations, the system can identify the one or more parameters. The parameters can include a length of a cable from which the load is slung from the aerial vehicle, or dimensions of the load. In some implementations, the system can receive data from a machine-readable code captured by a scanning device. In some implementations, the system can determine the one or more parameters based on the data of the machine-readable code. In some implementations, the system can receive, via a user interface of the aerial vehicle, the one or parameters. In some implementations, the system can establish the route with a function that balances a distance of the route with an amount of acceleration of the load slung from the aerial vehicle. In some implementations, the system can obtain data detected by one or more sensors of the aerial vehicle. The data can be obtained subsequent to establishment of the route and departure of the aerial vehicle from the first location. In some implementations, the system can predict a second volume for the load slung from the aerial vehicle based on the data. In some implementations, the system can modify the route to generate a second route to the second location. The modification can be responsive to the second volume.

In some implementations, the system can establish the route prior to traversal of the route by the aerial vehicle. In some implementations, the system can detect a wind speed subsequent to departure of the aerial vehicle from the first location. The wind speed can be a sensor of the aerial vehicle. In some implementations, the system can predict, a second volume for the load slung from the aerial vehicle. The second volume can be greater than the volume. The prediction can be based on the wind speed. In some implementations, the system can modify the route to generate a second route. The second route can avoid the collision between the one or more obstacles in the terrain and the load slung from the aerial vehicle. The second route can be longer than the route. The modification can be based on the second volume being greater than the volume. In some implementations, the system can receive a measurement of an angle between an axis that is perpendicular to a bottom of the aerial vehicle and a cable from which the load is slung. The measurement can be from a sensor of the aerial vehicle subsequent to departure from the first location and prior to arrival at the second location.

In some implementations, the system can predict a second volume for the load slung from the aerial vehicle. The second volume can be less than the volume. The prediction can be based on the angle. In some implementations, the system can modify the route to generate a second route configured to avoid the collision between the one or more obstacles in the terrain and the load slung from the aerial vehicle. The second route can be shorter than the route. The modification can be based on the second volume being less than the volume. In some implementations, the system can execute the action including presenting the route. The route can be presented via a graphical user interface on a display device within the aerial vehicle. In some implementations, the system can execute the action including navigating the aerial vehicle along the route from the first location to the second location. The navigation can be autonomous.

In some implementations, the system can include a global planner. The global planner can be executed by the one or more processors. In some implementations, the global planner can retrieve a world model for the terrain. In some implementations, the global planner can establish the route based on the world model and the volume predicted to be occupied by the load slung from the aerial vehicle. The establishment can be prior to lift-off of the aerial vehicle. In some implementations, the system can include a local motion planner. The local motion planner can be executed by the one or more processors. In some implementations, the local motion planner can receive data corresponding to at least one of an angle of a cable attached to the load, a wind speed, or aircraft motion. The data can be received from one or more sensors of the aerial vehicle subsequent to lift-off of the aerial vehicle. In some implementations, the local motion planner can update the volume based on the data. In some implementations, the local motion planner can determine a probability of collision between the load and an obstacle in the terrain along the route. The determination can be based on the updated volume. In some implementations, the local motion planner can modify the route to reduce the probability of collision to less than a threshold. The modification can be responsive to the probability of collision greater than or equal to the threshold. In some implementations, the aerial vehicle comprises a helicopter or an unmanned aerial vehicle.

An aspect of the present disclosure can relate to a method. The method can be performed by one or more processors coupled to memory. The method can include predicting a volume to be occupied by a load slung from an aerial vehicle. The prediction can be based on one or more parameters of the load. The method can include establishing a route from a first location to a second location. The route can be configured to avoid a collision between one or more obstacles in the terrain and the load slung from the aerial vehicle. The route can be based on a map of a terrain and the volume predicted to be occupied by the load slung from the aerial vehicle. The method can include executing an action to navigate the aerial vehicle along the route to avoid the collision between the one or more obstacles in the terrain and the load slung from the aerial vehicle.

The method can include identifying the one or more parameters. The parameters can include a length of a cable from which the load is slung from the aerial vehicle, and dimensions of the load. The method can include receiving data from a machine-readable code captured by a scanning device. The method can include determining the one or more parameters based on the data of the machine-readable code. The method can include obtaining data detected by one or more sensors of the aerial vehicle. The data can be obtained subsequent to establishing the route and departure of the aerial vehicle from the first location. The method can include predicting a second volume for the load slung from the aerial vehicle based on the data. The method can include modifying the route to generate a second route to the second location. The modification can be responsive to the second volume.

The method can include establishing the route prior to traversal of the route by the aerial vehicle. The method can include detecting a wind speed subsequent to departure of the aerial vehicle from the first location. The detection can be from a sensor of the aerial vehicle. The sensor can include predicting a second volume for the load slung from the aerial vehicle, where the second volume is greater than the volume. The prediction of the second volume can be based on the wind speed. The method can include modifying the route to generate a second route that is configured to avoid the collision between the one or more obstacles in the terrain and the load slung from the aerial vehicle. The second route can be longer than the route, and the one or more processors can modify the route based on the second volume being greater than the volume. The one or more processors can execute the action by presenting the route via a graphical user interface on a display device within the aerial vehicle.

An aspect of the present disclosure can relate to an aerial vehicle. The aerial vehicle can include a cable having a first end and a second end opposite the first end. The first end of the cable can be coupled to a bottom portion of the aerial vehicle and the second end can be coupled to a load that is slung from the aerial vehicle via the cable. The aerial vehicle can include a flight system comprising one or more processors coupled with memory. The flight system can predict a volume to be occupied by the load. The prediction can be based on one or more parameters of a load slung from the aerial vehicle. The flight system can establish a route from a first location to a second location configured to avoid a collision between one or more obstacles in the terrain and the load slung from the aerial vehicle. The route can be based on a map of a terrain and the volume predicted to be occupied by the load slung from the aerial vehicle. The flight system can execute an action. The action can include navigating the aerial vehicle along the route to avoid the collision between the one or more obstacles in the terrain and the load slung from the aerial vehicle.

In some implementations, the flight system can receive data from a machine-readable code captured by a scanning device. In some implementations, the flight system can determine the one or more parameters based on the data of the machine-readable code.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which can be carried on appropriate carrier media (computer readable media), which can be tangible carrier media (e.g. disks or other non-transitory storage media) or intangible carrier media (e.g. communication signals). Aspects can also be implemented using suitable apparatus, which can take the form of programmable computers running computer programs arranged to implement the aspects. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
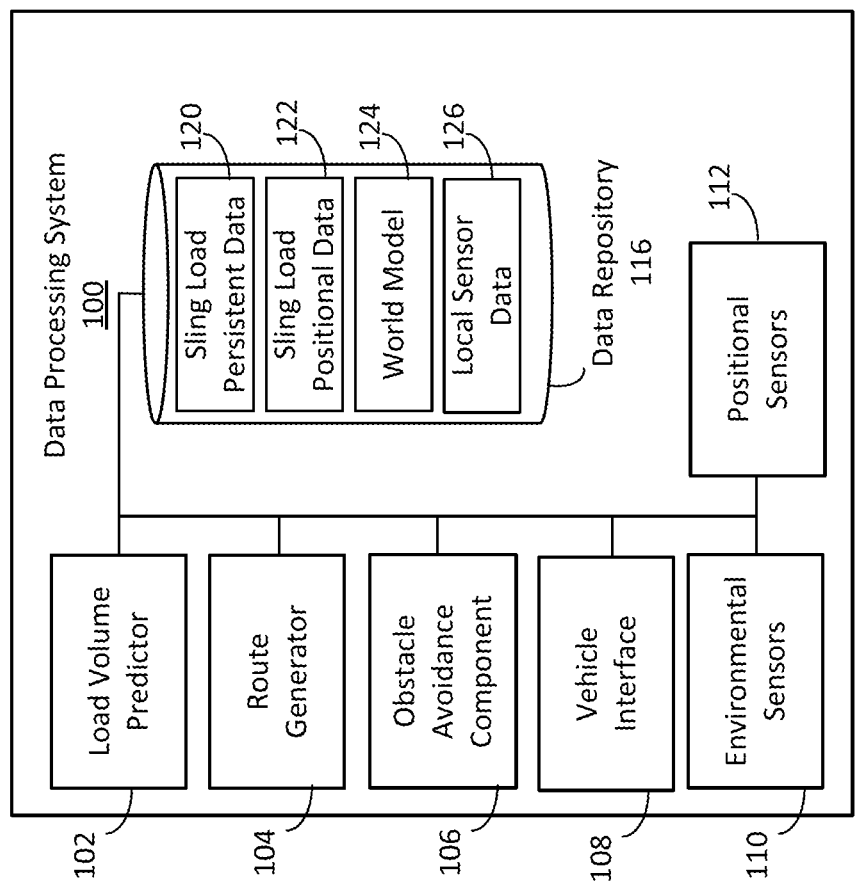
FIG. 1 illustrates a block diagram of an example data processing system, in accordance with one or more implementations.

In the following detailed description, reference is made to the accompanying drawings, which form a part hereof. In the drawings, similar symbols typically identify similar components, unless context indicates otherwise. The illustrative implementations described in the detailed description, drawings, and claims are not meant to be limiting. Other implementations can be utilized, and other changes can be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The systems, apparatuses, and methods described herein allow for volume predictions of a slung load which can be used for navigational actions. The volume a slung load occupied can vary based on parameters of the slung load, environmental parameters, and positional sensors of an aerial vehicle carrying the slung load (such as acceleration and turn rate). This technical solution determines a volume occupied by the slung load, including a position of the slung load, and a plurality of positions the slung load can occupy, responsive to the operation of an aerial vehicle in the environment. The predication can define a route that avoids collision with one or more obstacles. The obstacles can be determined in real time or in advance of the detection of the obstacles by the aerial vehicle (e.g., based on terrain data). Doing so generates accurate flight paths that avoid collisions, and is responsive to an environment according to available environmental data (e.g., sensor data or global data such as terrain maps). This allows an aerial vehicle, or data processing system thereof, to determine a route which can be modified responsive to detected obstacles.

Referring now to FIG. 1, illustrated is a block diagram of an example data processing system 100, in accordance with one or more implementations. The data processing system 100 can include at least one load volume predictor 102. The data processing system 100 can include at least one route generator 104. The data processing system 100 can include at least one obstacle avoidance component 106. The data processing system 100 can include at least one vehicle interface 108. The data processing system 100 can include at least one environmental sensor 110. The data processing system 100 can include at least one positional sensor 112. The data processing system 100 can include at least one data repository 116.

The load volume predictor 102, route generator 104, obstacle avoidance component 106, vehicle interface 108, environmental sensor 110, or positional sensors 112 can each include one processing unit or other logic device such as programmable logic array engine, or module configured to communicate with the data repository 116 or database. The load volume predictor 102, route generator 104, obstacle avoidance component 106, vehicle interface 108, environmental sensor 110, or positional sensors 112 can be separate components, a single component, or part of the data processing system 100. The data processing system 100 can include hardware elements, such as one or more processors, logic devices, or circuits. For example, the data processing system 100 can include one or more components, structures or functionality of a computing device depicted in FIG. 10.

The data repository 116 can include one or more local or distributed databases, and can include a database management system. The data repository 116 can include computer data storage or memory and can store one or more of sling load persistent data 120, sling load positional data 122, world model 124, and local sensor data 126. The sling load persistent data 120 can include information related to the slung load that remains constant during navigation of a route such as a mass, a size or shape, a durability, or a length of an associated connection. The sling load persistent data 120 can include a maximum cable angle such as an angle based on the load (e.g., previous experience with the load or similar loads). The maximum cable angle can be used, for example, by a route generator 104 to generate a route. Persistent data can vary according to a slung load. For example, the mass of a slung load comprising a water bucket configured to be released during a route may not be persistent. The sling load positional data 122 can include a sling load cable angle or direction. The world model 124 can include a predefined route for an aerial vehicle, and major terrain features such as mountains or valleys. The local sensor data 126 can include information relating to a local environment such as the position of additional vehicles, vegetation, or snow drifts.

Still referring to FIG. 1, and in further detail, the data processing system 100 can include at least one load volume predictor 102 designed, constructed or operational to predict a volume occupied by a slung load. The load volume predictor 102 can predict a volume occupied by the slung load based on parameters of the slung load, environmental conditions, or vehicle characteristics. For example, the load volume predictor 102 can define the volume based on a conical structure extending from a connection point between at least one cable attached to the load or to the vehicle. The load volume predictor 102 can determine a height of the cone based on a distance of the one or more cables (which as referred to herein can include various straps, ropes, netting, or rigid members used to suspend a load from an aerial vehicle). The load volume predictor 102 can determine the height of the cone based on the parameters of the load such as a height, weight, density, or shape thereof. For example, a slung load secured at a point along an upper surface can be included in the height of a cone.

The load volume predictor 102 can determine the volume based on environmental conditions such as a sustained or gusting wind speed. For example, the load volume predictor 102 can predict an increased angle of the cable attached to the load in high winds, resulting in an increased volume. For example, an aerial vehicle can be traversing a route, and the load volume predictor 102 can determine a cable angle. The cable angle can be based on one or more measurements (e.g., by the positional sensors 112) or an estimate based on environmental data (e.g., environmental data measured by the environmental sensors 110 or comprised in the world model 124). The load volume predictor 102 can predict a position of a load or cable angle based on vehicle characteristics. The vehicle characteristics can include a typical or maximum turn speed, directional change or other vehicle control characteristics.

The vehicle characteristics can include a possible or expected input. For example, a future acceleration, speed, vertical speed, or turn rate of the vehicle can be predicted based an anticipated route (e.g., a route traversed by a human pilot or an autonomous vehicle). The load volume predictor 102 can predict the volume based on all possible inputs, or a subset thereof. For example, the load volume predictor 102 can predict a volume of a slung load based on all possible vehicle control inputs, or can eliminate one or more possible inputs (e.g., due to non-adherence to a route, a collision resulting from an input, or another criteria rendering a flight control input improbable). The load volume predictor 102 can interface iteratively with flight inputs. For example, the load volume predictor 102 can interface with a human or autonomously piloted vehicle via the vehicle interface 108 to update the volume based on predicted, planned, or possible user input, such that the predicted, planned, or possible user input may be modified (e.g., via the vehicle interface 108), responsive to the updated volume.

The load volume predictor 102 can determine one or more probabilistic volumes. For example, a first volume can be determined according to an expected operation (e.g., a pilots adherence to a designated route, and an expected range of environmental conditions). A second volume can be determined according to an unexpected operation, such as an unexpected vehicle interface 108 input or unexpected environmental condition (e.g., wind gust or obstacle movement exceeding a threshold). The volume can be based on an angle of the cable. (e.g., can be a cone defined at least in part by the cable angle) Indeed, any number of potential load volumes can be predicted. The load volume predictor 102 can include one or more thresholds (e.g., probabilistic thresholds) to determine a load volume. For example, the load volume predictor 102 can include one set of thresholds to determine a selected load volume, or can include a plurality of sets of load volume thresholds to determine a plurality of load volumes.

The data processing system 100 can include at least one route generator 104 designed, constructed or operational to establish a route between locations. As discussed herein, a route can be a path of travel which is defined continuously or as a series of waypoints. The route generator 104 can include a global planner or a local motion planner. The global planner can determine a route based on the world model 124 or sling load persistent data 120. For example, the global planner can determine a probable route based on a terrain map or a sling load parameter (e.g., weight or cable length). For example, the global planner can determine a route based on information available in a global planner such as weather conditions, terrain or other obstacles (e.g., structures, air space restrictions, or desired travel corridors). The global planner can determine the route prior to the aerial vehicle traversing all or a portion of the route, such as prior to a liftoff of the aerial vehicle. The route generator 104 can based the route on a plurality of parameters. For example, the route generator 104 can implement a cost function to minimize or otherwise adjust a route distance, fuel, use, time to transit the route, or an amount of acceleration at one or more points along the route. For example, the cost function can adjust (e.g., balanced between) an acceleration of the route (e.g., the maximum volume of the load based on the acceleration of the aerial vehicle) or the distance of the route, such as by providing the acceleration, the distance, or other route parameters with a weight, and determined in a weighted score of the route therefrom.

The local motion planner can determine one or more flight paths or routes based on local sensor data 126. For example, the local motion planner can identify structures which are not defined by the global planner (e.g., new or transient structures), vegetation, or additional vehicles (e.g., additional aerial vehicles), such as according to the environmental sensors 110 (e.g., LiDAR, radar, or cameras). For example, the local motion planner can receive an indication of a potential collision from the obstacle avoidance component 106, and can, responsive to the indication, determine a route to rejoin the route designated by the global planner, or another route to a destination.

The local motion planner and the global planner of the route generator 104 can interoperate. For example, the global planner can determine a first route (e.g., to deliver an air conditioning unit to a structure under construction). While navigating the route, an environmental sensor 110 (e.g., LiDAR, radar, or cameras) can detect an obstacle along the route (such as a crane). The local motion planner can, responsive to the detection of the obstacle, determine a second route to avoid the obstacle. The second route can, for example, return to merge with, or otherwise intersect the first route. Upon completion of the second route, the global planner can determine a third route to proceed to the destination. The third route can include any number of paths of travel or waypoints shared with the first route, or contain any number of paths of travel or waypoints which are not shared with the first route. In some implementations, the local motion planner and global planner can determine the second route. For example, the local motion planner can determine a plurality of second routes to avoid the obstacle, which can be evaluated by the global planner according to global planner criteria (e.g., fuel use or time to destination).

The local motion planner can operate absent interoperation with the global planner. For example, the local motion planner can operate without a global planner, or each of the local motion planner and the global planner can provide data to the vehicle interface 108 whereby a vehicle can navigate responsive to the information provided therefrom.

The data processing system 100 can include at least one obstacle avoidance component 106 designed, constructed or operational to detect a potential collision between an aerial vehicle or a slung load thereof, and an obstacle. The obstacle avoidance component 106 can predict a collision probabilistically. For example, the obstacle avoidance component 106 can receive a plurality of volumes associated with a slung load from the load volume predictor 102, and determine that a first portion of the plurality of volumes result in a collision, whereas the second portion of the plurality of volumes do not result in a collision.

The global planner 605 can determine a route based on a search-based, sample-based, or optimization-based algorithms. For example, the global planner 605 can employ at least one A*, rapidly exploring random trees (RRT), or particle swarm optimization (PSO) technique. The local motion planner 705 can employ various predictive based motion planning techniques such as model predictive control (MPC) or closed loop RRT (CL_RRT).

The obstacle avoidance component 106 can classify a collision type or additional detail. For example, a slung load tree being removed from a heavily forested area can result in one or more collisions. These collisions can be classed according to a parameter of the load, the vehicle, or the environment. Some collisions can be classified as permissible. For example, the obstacle avoidance component 106 can predict that a load being delivered to a rooftop will collide with the rooftop. Collisions can be classified as low risk, medium risk, high risk, or otherwise. The obstacle avoidance component 106 can determine that the collision is classed as a non-collision event. For example, the classification can be based on a durability of the slung load, the location of the slung load, the speed of the aerial vehicle or of the slung load, or an indication received from the vehicle interface 108 (e.g., a user indication of an intention to deploy the load to the rooftop). The obstacle avoidance component 106 can provide an indication of one or more predicted collisions to the route generator 104 to determine an alternate route. For example, the alternate route can be a longer route than a previously defined route.

The data processing system 100 can include at least one vehicle interface 108 designed, constructed or operational to execute an action to navigate the aerial vehicle along the route. The vehicle interface 108 can include a trajectory follower 720 having aircraft flight controls (e.g., throttle, anti-torque controls or a cyclic control). For example, the trajectory follower 720 of the vehicle interface 108 can directly control the flight of the aerial vehicle (e.g., in an autonomous aerial vehicle) to navigate a route determined or received by the data processing system 100. The vehicle interface 108 can receive maneuver the aircraft based on sensed or determined information. For example, the vehicle interface 108 can receive information from the obstacle avoidance component 106 and control the operation of the aircraft responsive to the information. For example, the trajectory follower 720 of the vehicle interface 108 can maneuver the aerial vehicle to avoid an obstacle or query or otherwise receive alternate route information from the route generator 104. The trajectory follower 720 can maneuver the aerial vehicle to traverse the alternate route. For example, an autonomous or semiautonomous flight control system can perform one or more navigational actions to maneuver the vehicle from a first location to a second location.

The vehicle interface 108 can include a graphical user interface (GUI). For example, a GUI can present information to a pilot through a GUI or various visual or audio indicators (e.g., audible alarms, LEDs, or haptic feedback). The GUI can present information such as a position of a vehicle, a volume occupied by a load, or a route associated with the aerial vehicle. The vehicle interface 108 can include one or more inputs such as buttons (e.g., a keypad), touchscreens, levers, pedals, and the like. For example, the vehicle interface 108 can receive flight controls or other information via the vehicle interface 108. For example, the vehicle interface 108 can receive parameters associated with a slung load via the interface, such as from a sensor, or an entry of a user.

The data processing system 100 can include at least one environmental sensor 110 designed, constructed or operational to detect environmental conditions associated with an aerial vehicle. For example, the environmental sensor 110 can detect a wind speed (e.g., averaged, maximum, or current). The environmental sensor 110 can detect additional vehicles, terrain features, structures, and the like. The environmental sensors 110 can include additional terrain detail relative to the world model 124. The environmental sensors 110 can detect a position, direction of travel, or other information of additional vehicles. The information can be provided to the obstacle avoidance component 106 to avoid the present or predicted location of the additional vehicle. For example, the environmental sensors 110, an d other sensors associated with the aerial vehicle can collect information subsequent to establishment of the route and departure of the aerial vehicle from an origin (e.g., more current or higher resolution data than is used to establish the route).

The environmental sensors 110 can be mounted on the interior or the exterior of the aerial vehicle. Non-limiting examples of the environmental sensors 110 include LiDAR sensors, visible light sensors (e.g., cameras, video capture devices, etc.), infrared light sensors, accelerometers, gyroscopes, magnetometers, elevation sensors, pressure sensors, temperature sensors, force sensors, proximity sensors, radar sensors, angle-of-attack sensors, global positioning system (GPS) sensors, thermal infrared cameras, and thermal imaging cameras, among others. In some implementations, one or more of the sensors can provide local sensor data 126 periodically (e.g., in a batch transmission, etc.) to the obstacle avoidance component 106. In some implementations, one or more of the sensors can provide local sensor data 126 to the obstacle avoidance component 106 upon receiving a corresponding request for sensor data from the obstacle avoidance component 106. The sensors can provide raw LiDAR measurements, which can be stored in the memory as part of the local sensor data 126. In some implementations, the obstacle avoidance component 106 can retrieve or receive raw local sensor data 126 from the sensors, and store the raw data as part of the local sensor data 126.

The data processing system 100 can include at least one positional sensor 112 designed, constructed or operational to identify parameters associated with a slung load or the aerial vehicle. For example, a positional sensor 112 can determine an air speed or ground speed of the aerial vehicle, an elevation of the aerial vehicle, or an orientation of the aerial vehicle. The orientation of the aerial vehicle can include roll, pitch, and yaw, as well as a relative position of a control surface (e.g., a rotor, or an aerodynamic surface) relative to the wind or another object. The positional sensor 112 can detect a position of a slung load. For example, the positional sensor 112 can detect a position of the load and a roll, pitch, or yaw associated with the load. The positional sensor 112 can detect a position of the load by observation of the load or observation of one or more cables. For example, positional sensors 112 can detect one or more features, edges, or locations of the slung load. The features, edges, or locations can be recognized by image recognition, triangulation of one or more wireless transceivers, or other positional sensors 112. The features, edges, or locations can be applied to the load to aid the positional sensors 112 (e.g., machine readable codes such as QR codes, reflective tape, or other aids).

The position of a load can be inferred, calculated or detected by measuring a location, force, angle, deflection, or other property of the cable. For example, a positional sensor 112 can include or interface with a three-dimensional spatial perception system to determine the position of a cable based on a videographic, LiDAR, radar, electric, or other sensed positon of a cable. For example, the cable can be illuminated (e.g., by emitting electromagnetic radiation having a wavelength of about 600 nanometers to about 1600 nanometers), and a portion of the electromagnetic radiation can be reflected by the cable and received by the positional sensor 112. The electromagnetic radiation can be visible light, or light in the infrared spectrum. For example, the light can be selected according to a light visible to a crew or observer of the aerial vehicle. (e.g., 1550 nanometers can be selected to avoid interference with or detection by a visual observer or aircraft pilot with or without night vision equipment operating at a lower wavelength). The positional sensor 112 can compare a cable position (e.g., cable angle) to a cable angle limit (e.g., based on a present or future position of the cable).

The positional sensor 112 or other component of the data processing system 100 can determine or estimate a future position of the cable by capturing a plurality of cable positions over time (e.g., based on a reflection of light to a LiDAR sensor or other methods disclosed herein). The positional sensor 112 or other component of the data processing system 100 can predict the future position based on a current position, turn rate, or acceleration of the aerial vehicle, or forces acting on the load or cables (e.g., wind, rotor wash, water upon a submerged load, a collision between a load and a vegetation or terrain feature, or the like). For example, the data processing system 100 can calculate a future motion or position of the aerial vehicle 205 according to a model. The positional sensor 112 can detect electromagnetic radiation emitted or reflected by the load. For example, the load can reflect electromagnetic radiation directed to the load from the aerial vehicle. The position of the cable or the load can determine or inform a flight control (e.g., via the vehicle interface) such as to avoid a collision, avoid exceeding a maximum cable angle, or otherwise control the aerial vehicle.

As used herein, the slung load refers to a load that is or may be slung to the aerial vehicle. For example, the aerial vehicle can detect a slung load prior to the connection of the slung load (such as in order to identify the slung load or verify the slung load is appropriate for the aerial vehicle). The positional sensor 112 detect the parameters at various times of operation, such as prior or subsequent to the connection of the slung load, prior or subsequent to liftoff, or prior or subsequent to traversing one or more portions of a route. For example, the positional sensor 112 can determine the cable angle relative to an axis that is parallel to the bottom of the aerial vehicle, to a ground surface, or to gravity.

The positional sensor 112 can read a machine readable code associated with the slung load. For example, the machine readable code can be a bar code such as a QR code, a wireless transceiver such as an nearfield communication ("NEC") transceiver, or a load feature or textual description which can be recognized (e.g., by an optical character recognition system or another vision system). The machine readable code can include one or more parameters of the load. For example, the machine readable code can include any of a weight or other dimension of a slung load, a durability, a maximum angle, a length or other property of cable, a desired location associated with the load, or other information associated with the load. The positional sensor 112 can determine one or more parameters of the load from the machine readable code, such as by further processing or in conjunction with additional information (e.g., can retrieve parameters associated with an identifier of the slung load). Load parameters can be tokenized for user input (e.g., input to the vehicle interface 108, such as by manual entry or a wireless transmission) or the parameters of the machine readable code can be transferred to the vehicle interface 108.

Some sensors, subcomponents, or portions can provide environmental and positional sensing. For example, a LiDAR sensor can determine a position of a load, and a terrain map of an area.

Figure 2:
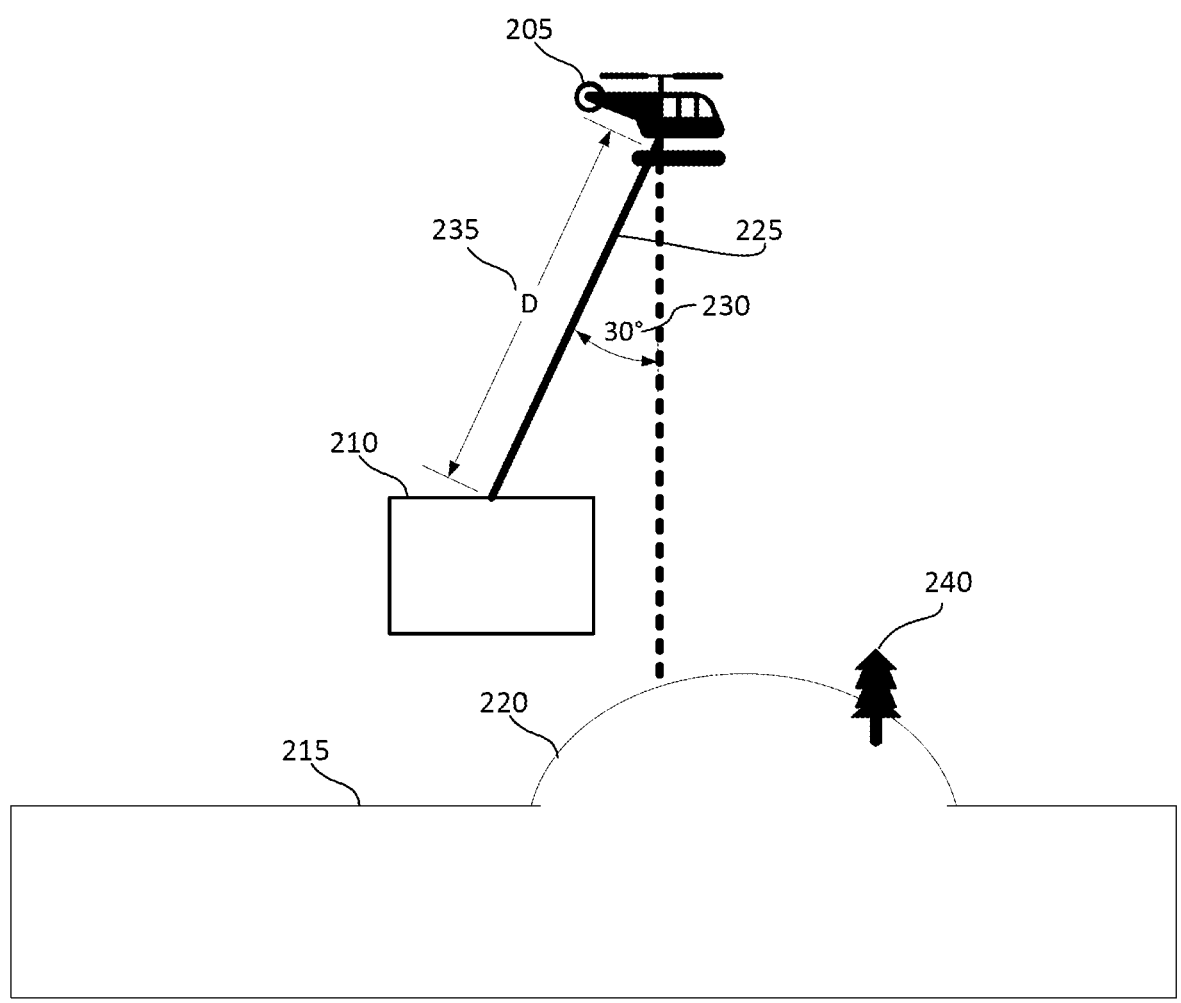
FIG. 2 illustrates an example representation of an aerial vehicle with a slung load in relation to an environment, in accordance with one or more implementations.

Referring to FIG. 2, illustrated is an example representation of an aerial vehicle 205 with a slung load 210 in relation to an environment 200. The aerial vehicle 205 can be any type of aerial vehicle 205, such as an airplane, a helicopter, a drone, a vertical take-off and landing (VTOL) aircraft, or any other type of aerial vehicle 205. The aerial vehicle 205 can be operated by one or more pilots, for example, using the vehicle interface 108, or can be piloted autonomously. The aerial vehicle 205 can be equipped with any type of device or system that can be used to complete a task or mission that has been assigned to the aerial vehicle 205. The aerial vehicle 205 can include one or more communications interfaces (not pictured), via which the aerial vehicle 205 or the vehicle interface 108 can transmit or receive information, including any of the information used in the techniques described herein.

The slung load 210 is connected to the aerial vehicle 205 by a cable 225. The cable 225 can have at least two ends wherein at least one end is secured to the aerial vehicle 205, and at least one end is secured to the slung load 210. One or more cable angles 230 can be defined for the cable 225. The cable angle 230 can be measured relative to the aerial vehicle 205, a surface 215, or another reference such as a structure. A deflection of the cable can result in a plurality of cable angles disposed along the length 235 of the cable 225. For example, a cable 225 can be curved (e.g., due to a prevailing wind or a movement of the aerial vehicle 205) such that various points along the distance of the cable 225 are associated with various cable angles 230.

The aerial vehicle 205 can be disposed over a surface 215 such as land or water. The surface can be described by the world model 124. For example, the world model 124 an include a terrain map comprising a plurality of features 220 such as hills, mountains, valley's, cliffs, or saddles. For example, a plurality of terrain features 220 can be comprised within a terrain map (e.g., by the vehicle interface 108 or another component of the data processing system 100). The terrain map can be a one dimensional, two-dimensional, 2.5D (e.g., two-dimensional 2D graphical projections and similar techniques that simulate the appearance of being three-dimensional when in fact they are not, such as a heatmap, etc.), or three-dimensional model of terrain, which is generated from the world model 124 using the techniques described herein.

The terrain model can include local sensor data 126. The local sensor data 126 can include LiDAR or radar points from the environment. The terrain map can be generated from the coordinates of LiDAR or radar points. The terrain map can be presented by the vehicle interface 108 (e.g., presented to a human operator or an autonomous flight control system). The data processing system 100 can generate or update the terrain map. For example, each time local sensor data 126 is updated (e.g., each time a LiDAR scan is performed), the local sensor data 126 can be applied to the terrain map. In some implementations, the data processing system 100 can expand the terrain map as additional scans are performed and processed. For example, the local sensor data 126 can include environmental objects 240 such as vegetation, structures, vehicles, and other detectable objects. For example, an environmental object 240 such as a tree can be detected by one or more sensors.

Figure 3:
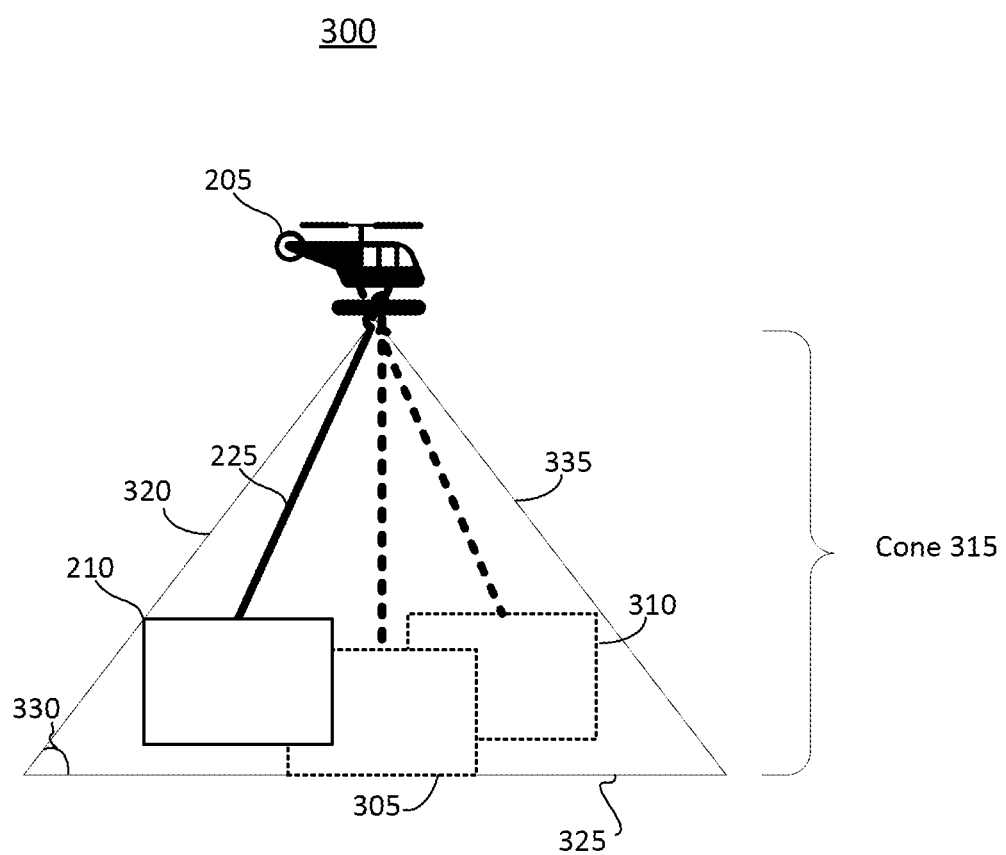
FIG. 3 illustrates an example representation of a volumetric diagram including an aerial vehicle carrying a sling load, in accordance with one or more implementations.

Referring to FIG. 3, illustrated is an example representation of a volumetric diagram 300 including an aerial vehicle 205 carrying a sling load 210. The slung load 210 is depicted at a first position, along with a cable 225. A plurality of positions which can be occupied by the slung load 210 (with respect to the aerial vehicle 205) can be defined by a cone 315 which describes a volume which the slung load 210 can occupy (e.g., a superposition of the slung load 210). A first edge 320 of the cone 315 can be defined by extending a line from the aerial vehicle 205 (e.g., a connection point for the cable 225 to the aerial vehicle 205) to a surface of the slung load 210. One or more additional positions for the slung load 210 can be predicted. For example, a first potential position 305, wherein the sling load 210 is disposed directly below the helicopter defines a base 325 of the cone 315. A second potential position 310, wherein the cable 225 extends in an opposite direction defines a second edge 335 of the cone 315, such as according to an angle 330 between the base 325 of the cone 315 and a line projected from the aerial vehicle 205 and an edge of the load 210. For example, the cone 315 can be defined based on projecting a calculated or measured cable angle 230 radially around the aerial vehicle 205.

The geometry of a slung load 210 (also referred to herein as a load 210 or sling load 210) can be modeled according to various levels of complexity. For example, an artillery piece can be represented as one or more cones, spheres, rectangular prisms, a detailed model thereof, etc.). The cone 315 edges can depend on a shape of the load 210. For example, the artillery piece mentioned above can rotate freely, or can be secured to avoid rotation, such that the first edge 320 of the cone 315 and the second edge 335 of the cone 315 can have different associated angles, in implementations in which the angle 330 of the cable 225 is similar in each direction. The load volume predictor 102 can model the cone 315 according to various inputs. For example, according to a route, a prevailing wind, or parameters associated with the load 210, the angles associated with the first or second edges (or additional edges of a three dimensional cone 315) can vary. Moreover, some portion of the cone 315 can be eliminated. For example, a load 210 in the second potential position 310 can be associated with one or more cables 225 which would not extend to a distance sufficient to reach the extreme junction of the base 325 of the cone 315 and the second edge 335 of the cone 315. As referred to herein, the cone 315 refers to various volumetric diagrams which may be or include a conical shape. For example, the volumetric diagram 300 can be defined based on cylinder defined by the base 325 of the cone 315, or another lateral extreme of the load 210 (e.g., when depicted on a two-dimensional display).

The load volume predictor 102 can include a margin portion of the cone 315. For example, the load volume predictor 102 can apply a margin to one or more inputs. For example, a margin can be applied to a predicted wind speed. The margin can be fixed or proportional. For example, the margin can be 5 meters per second or 10 percent. The margin can be probabilistic. For example, a probability can be selected to increase a confidence of a viability of a route. The load volume predictor 102 can apply the margin be applied to one or more parameters or an overall action or position. For example, a plurality of margins can be included with a plurality of parameters (e.g., to compound the margin), or a margin can be applied to a result (e.g., can be a fixed distance such as 5 meters).

Figure 4:
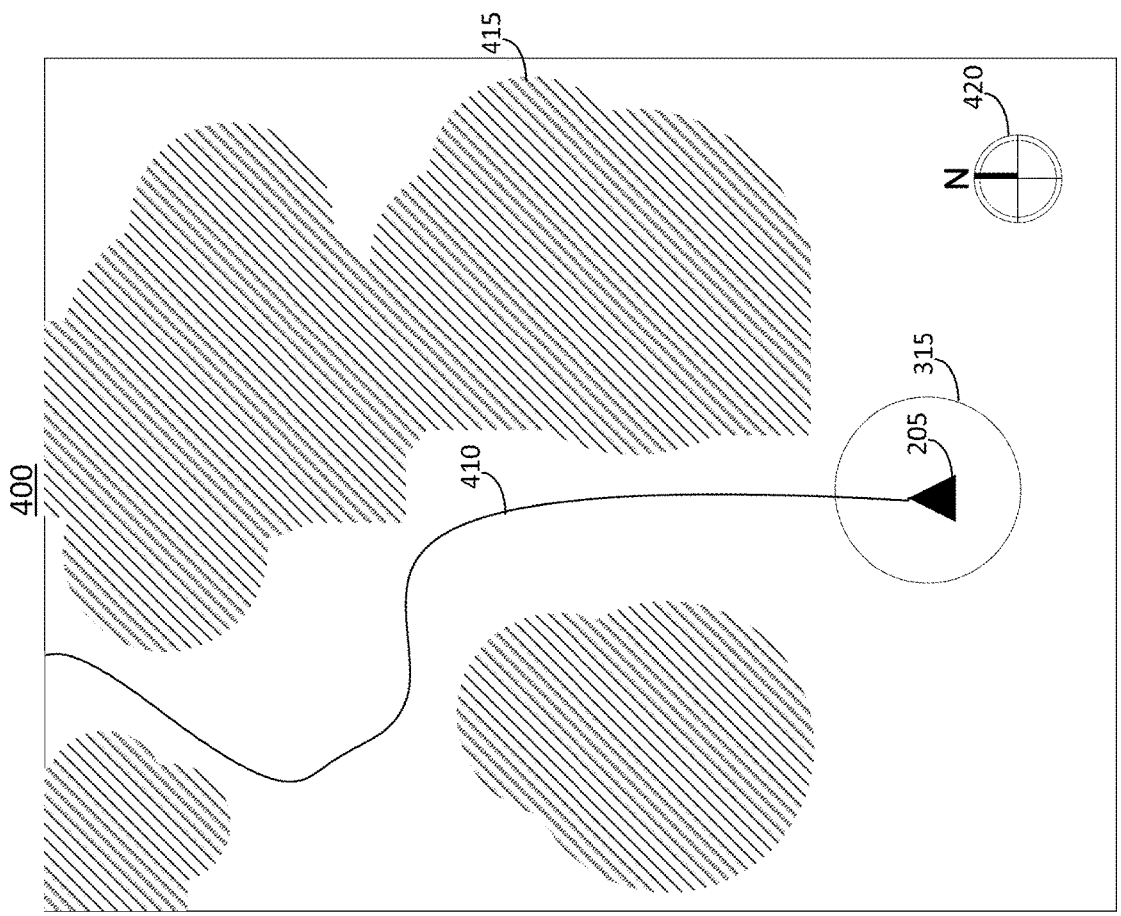
FIG. 4 illustrates a graphical user interface, in accordance with one or more implementations.

Referring to FIG. 4, a graphical user interface 400 is illustrated in accordance with one or more implementations. The vehicle interface 108 can include various output devices, such as the graphical user interface 400. The vehicle interface 108 can include any type of device capable of presenting information to an operator of the aerial vehicle 205 (e.g., a human operator or an autonomous flight control system). The graphical user interface 400 can be positioned within the aerial vehicle 205 such that it can be accessed by the operator during operation of the aerial vehicle 205, or can be remote from the vehicle, such that it can be accessed by a remote operator. The graphical user interface 400 can include devices that present specific sensor information, such as speed, direction, velocity, or location. The graphical user interface 400 can present information relating to the terrain map. For example, the graphical user interface 400 can display a two-dimensional (2D) or three-dimensional (3D) representation of the terrain map, which can be generated using the techniques described herein.

The graphical user interface 400 can include general display devices that can present information, such as the local sensor data 126, the terrain map, or the cone 315 as described in connection with the present techniques. The graphical user interface 400 can display a position of the aerial vehicle 205 in relation to the cone 315. The graphical user interface 400 can depict a route 410 in relation to an obstacle 415 which can comprise terrain features 220, environmental objects 240, a surface 215, or restricted airspace. The graphical user interface 400 can include one or more directional orientations 420. For example, the directional orientation 420 can include a ordinal direction, a direction to a waypoint, or a direction with respect to the ground surface 215, terrain feature 220 or the like. The obstacles 415 can include additional information such as an obstacle 415 height, size, priority, source (e.g., local sensor data 126 or world model 124 information). For example, the obstacles 415 can encode information according to a various colors, shapes, symbols, notations, and the like. For example, a current or future proximity of the slung load 210 to a terrain feature 220 can be depicted with yellow and red indications to depict a caution or warning, respectively, to a pilot.

Figure 5:
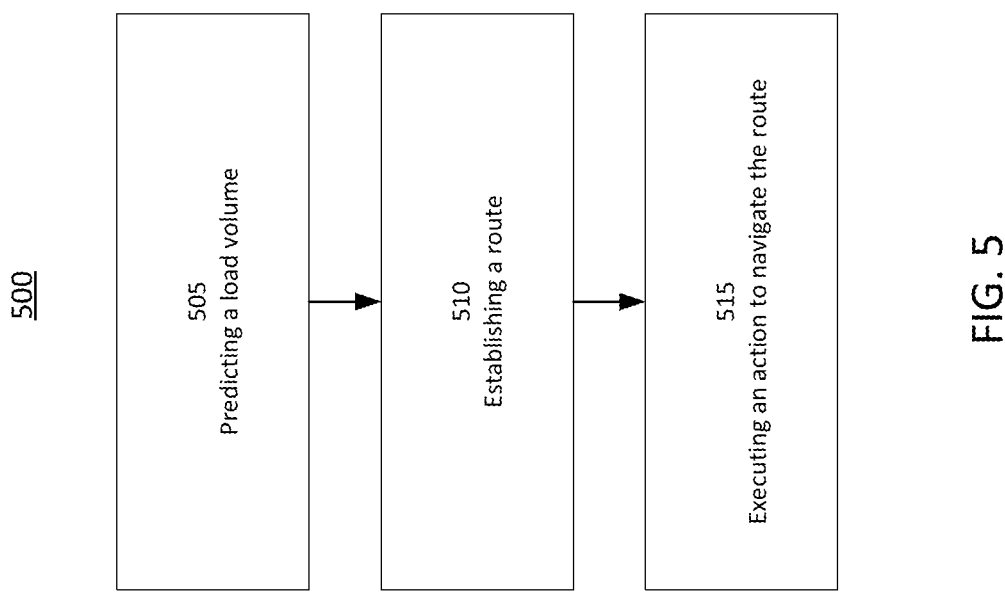
FIG. 5 illustrates a flow diagram of a method for navigation of an aerial vehicle with a slung load, in accordance with one or more implementations.

Referring now to FIG. 5 and others, depicted is an illustrative flow diagram of a method 500 for navigating an aerial vehicle 205 with a slung load 210, in accordance with one or more implementations. The method 500 can be executed, performed, or otherwise carried out by the data processing system 100, the computer system 1000 described herein in conjunction with FIG. 10, or any other computing devices described herein. In brief overview, the method 500 can include predicting a load volume (ACT 505), establishing a route 410 (ACT 510), and executing an action to navigate the route 410 (ACT 515).

In further detail, the method 500 can include predicting a volume occupied by a load slung from an aerial vehicle 205 by a load volume predictor 102 (ACT 505). The load volume predictor 102 can define a cone 315 based on the predictions of the volume. The cone 315 can be based on a position of the aerial vehicle 205. For example, the load volume predictor 102 can determine the volume relative to the position of the aerial vehicle 205. The volume can be based on the operation of the aerial vehicle 205. For example, the load volume predictor 102 can determine the cone 315 based on a speed of the aerial vehicle 205 (e.g., to determine a force exerted on the slung load 210 by the air), an altitude of the vehicle, (e.g., to determine a density of the air), or a current or predicted control adjustment of the aerial vehicle 205. The load volume predictor 102 can base the cone 315 on a rotation of the aerial vehicle 205, such as based on a known route 410, or another input from a vehicle interface 108. For example, the load volume predictor 102 can receive a predicted control input from an autonomous flight control system. The load volume predictor 102 can determine a cone 315 corresponding to the flight control input (e.g., based on a predicted acceleration of the aerial vehicle 205 incident to the flight control input).

The load volume predictor 102 can determine the cone 315 based on one or more parameters of a slung load 210. For example, the load volume predictor 102 can determine that a single cable 225 securing a single point on the aerial vehicle 205 to the slung load results in greater motion (e.g., a wider cone 315) than a load 210 slung from multiple points via multiple cables 225. The load volume predictor 102 can determine the cone 315 according the weight, height, flexibility, or elasticity of the cable 225. The load volume predictor 102 can determine the cone 315 based on a weight, density, weight distribution, or aerodynamic property of a load 210. The load volume predictor 102 can determine the cone 315 based on a durability, value, or nature of a load 210. For example, the load volume predictor 102 can determine the cone 315 based on a margin wherein the margin is based on a value, durability, or other parameter of a slung load 210. For example, a slung load 210 consisting of a pallet of canned goods may be associated with a different (e.g., lesser) margin than a slung load 210 of a human-occupied stretcher.

The load volume predictor 102 can determine the cone 315 based on one or more thresholds associated with the slung load 210. For example, the cone 315 can be associated with one or more angles of the slung load 210 or the cable 225. Some slung loads 210 can have a maximum acceleration, angle, or other property. For example, a full water bucket can have a maximum angle to avoid spillage of the contents. The vehicle interface 108 and load volume predictor 102 can determine a flight control path which does not exceed one or more parameters associated with a slung load 210.

The method 500 can include establishing a route 410 (ACT 510). For example, the route generator 104 can determine a route 410 based on the cone 315 generated by the load volume predictor 102. The route generator 104 can determine the route 410 between an origin location and a destination location. The origin location can be a current location of the aerial vehicle 205, or a different location. The route generator 104 can determine routes 410 connecting multiple locations or multiple slung loads 210. For example, a plurality of routes 410 can be generated to deliver a plurality of slung loads 210 wherein the plurality of routes 410 can be optimized (e.g., sequenced or adjusted) based on the routes 410. The route generator 104 can determine the routes 410 according to a height-velocity diagram, the cone 315, or the avoidance of obstacles 415. The route generator 104 can generate the route 410 according to a transit time, a fuel use, an acceleration, or other preference. The route generator 104 can determine the route 410 based on a world model 124 or local sensor data 126. For example, the route generator 104 can initially generate a route 410 based on a world model 124, and the aerial vehicle 205 can modify the route 410 during travel, in response to local sensor data 126. Local sensor data 126 can indicate the presence of an obstacle 415 not included in the world model 124 and the route generator 104 can adjust the route 410 (by substituting a longer route 410) to avoid the obstacle 415. Local sensor data 126 can indicate the absence of an obstacle 415 included in the world model 124, and the route generator 104 can adjust the route 410, such as by substituting a shorter, simpler, or more fuel efficient route 410.

The method 500 can include executing an action to navigate the route 410 (ACT 515). The action can be or include conveying the route 410 (e.g., to a pilot of the aircraft located in or remote from the aerial vehicle 205). For example, the vehicle interface 108 can display the route 410 on a GUI 400 in relation to the aerial vehicle 205, one or more directional orientations 420, or obstacles 415. The GUI 400 or other display or indicator can convey a distance from an obstacle 415, a recommended control of the vehicle, an alert, or other information.

The action can include manipulating a control interface of the aerial vehicle 205. For example, the aerial vehicle 205 can be autonomous (e.g., fully autonomous or semi-autonomous). The trajectory follower 720 can include or interface with autonomous systems to navigate the route 410. For example, the trajectory follower 720 can adjust the throttle, roll, pitch, or yaw of the aerial vehicle 205. The control of the aerial vehicle 205 can be selected to move the vehicle along a path, or to effect the volume of a cone 315 associated with a slung load 210. For example, a radius of a turn can be selected according to a resultant cone 315 and a resultant path can be provided to the trajectory follower 720.

Figure 6:
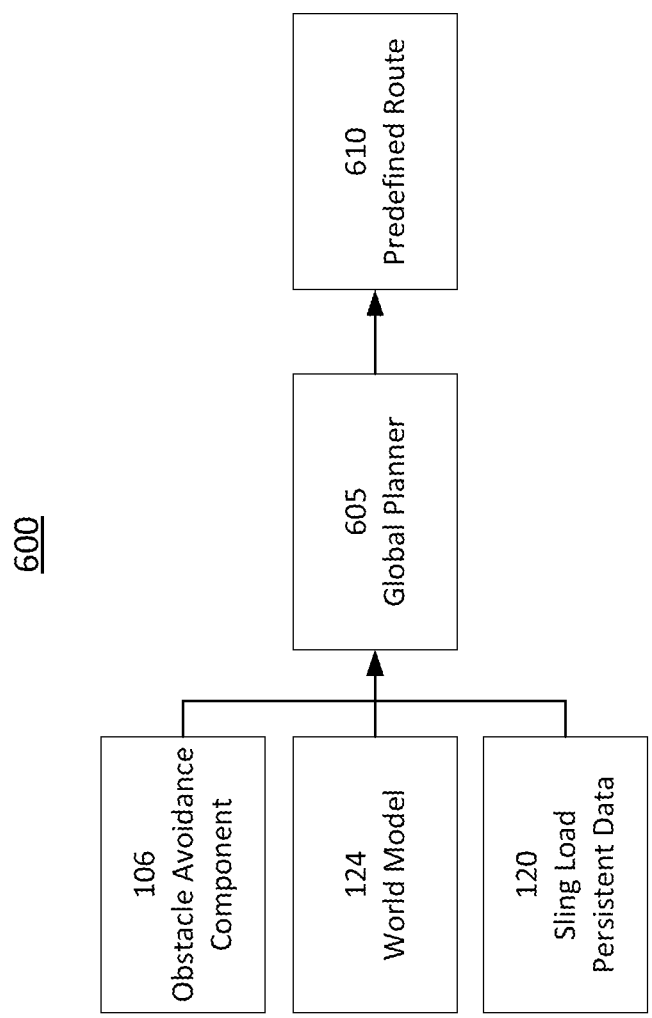
FIG. 6 illustrates a flow diagram for navigation of an aerial vehicle with a slung load, in accordance with one or more implementations.

Referring now to FIG. 6, a flow diagram 600 for navigation of an aerial vehicle 205 with a slung load 210 is illustrated, in accordance with one or more implementations. The global planner 605 receives one or more inputs from components including the sling load persistent data 120, the world model 124, and the obstacle avoidance component 106. For example, the global planner 605 can receive a height of a cable 225 associated with the slung load 210, a weight, size, shape, density, or other parameter of the slung load 210 which can be used to generate a cone 315 associated with the slung load 210. The global planner 605 can receive a world model 124 or information thereof such as a terrain map, weather forecast, information regarding at least one origin location and destination location, or aerial vehicle 205 information (e.g., available, thrust, endurance, etc.). The global planner 605 can receive obstacle 415 information from the obstacle avoidance component 106. For example, the obstacle avoidance component 106 can determine a plurality of locations of possible collisions based on the sling load persistent data 120 (e.g., the length 235 of a cable 225), and the world model 124 (e.g., the height of a terrain feature 220).

The global planner 605 can determine a predefined route 610 based on the received information. For example, the predefined route 610 can be disposed along the terrain map of the world model 124, wherein the sling load persistent data 120, such as the length 235 of a cable 225 of the slung load 210, is used to determine a volume occupied by the slung load 210 (e.g., by the load volume predictor 102, not depicted). The predefined route 610 can be checked for potential collisions by the obstacle avoidance component 106, such as by checking a predefined route 610, or providing input data to the global planner 605 to avoid generating a predefined route 610 associated with collisions (e.g., of the aerial vehicle 205 or the slung load 210). The predefined route 610 can be defined in advance of lift off of the aerial vehicle 205, in advance or one or more sensors of the aerial vehicle 205 detecting an obstacle 415 or environmental condition, or in advance of securing the slung load 210 to the aerial vehicle 205 (or subsequent to the various events).

Figure 7:
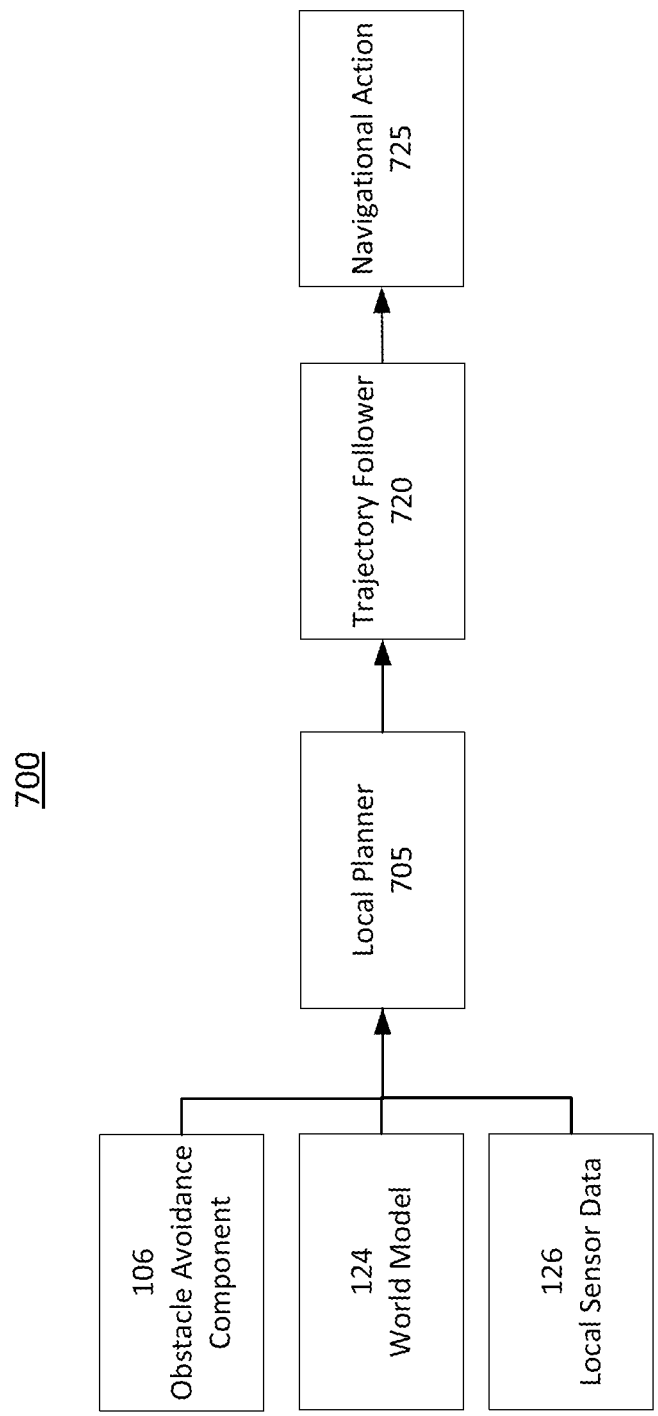
FIG. 7 illustrates another flow diagram for navigation of an aerial vehicle with a slung load, in accordance with one or more implementations.

Referring now to FIG. 7 and others, a flow diagram 700 for navigation of an aerial vehicle 205 with a slung load 210 is illustrated, in accordance with one or more implementations. The flow diagram 700 can be performed independently or subsequent to the flow diagram 600 of FIG. 6. For example, the predefined route 610 of FIG. 6 can be an initial route 410 of an aerial vehicle 205 whereupon the sensors of the aerial vehicle 205 can detect additional information relevant to the initial route 410 of the aerial vehicle 205. The flow diagram 700 presented herein can also be performed with another route 410, or absent any system defined route 410 (e.g., can be a real-time collision alert or avoidance system).

The local motion planner 705 receives one or more inputs from components including local sensor data 126, world model 124 information, and the obstacle avoidance component 106. For example, the local motion planner 705 can receive a LiDAR or radar scan of a plurality of terrain features 220 or environmental objects 240. The local motion planner 705 can receive a world model 124 such as a terrain map or a LiDAR scan from another vehicle. The local motion planner 705 can receive obstacle 415 information from the obstacle avoidance component 106. For example, the obstacle avoidance component 106 can determine a plurality of locations of possible collisions based on the sling load persistent data 120 (e.g., the length 235 of a cable 225), and the world model 124 (e.g., the height of a terrain feature 220).

The local motion planner 705 can determine a predefined route 610 based on the received information. For example, the predefined route 610 can be disposed along the terrain map of the world model 124, wherein the sling load persistent data 120, such as the length 235 of a cable 225 of the slung load 210, is used to determine a cone 315 (e.g., by the load volume predictor 102, not depicted). The predefined route 610 can be checked for potential collisions by the obstacle avoidance component 106, such as by checking a predefined route 610, or providing input data to the global planner 605 to avoid generating a predefined route 610 associated with collisions (e.g., of the aerial vehicle 205 or the slung load 210). The predefined route 610 can be defined in advance of the lift off of the aerial vehicle 205, in advance or one or more sensors of the aerial vehicle 205 detecting an obstacle 415 or environmental condition, or in advance of securing the slung load 210 to the aerial vehicle 205.

The route generator 104 can include a trajectory follower 720 to navigate a route determined an aerial vehicle 205 (e.g., by the local motion planner 705). The navigation of the route received by the trajectory follower 720 can avoid one or more obstacles 415 (e.g., to perform an evasive maneuver) based on the received route. For example, the local motion planner 705 or another planner can determine a trajectory to advance the aerial vehicle 205 along the route 410; the trajectory follower 720 can advance along the route. The planner (e.g., local motion planner 705) can determine the trajectory based on local sensor data 126 gathered from an environmental sensor 110 such as wind-speed, temperature, humidity, visibility, etc. The planner can determine the trajectory based on position of the aerial vehicle 205 relative to the route 410 (e.g., a waypoint or portion thereof), or other local sensor data 126 gathered by the positional or other sensors. The trajectory follower 720 can control the aerial vehicle 205 along the routes. A speed, acceleration, disposition (e.g., orientation, or a status of one or more component), flight control mode, or other local sensor data 126 can be evaluated by the data processing system 100. The trajectory follower 720 can interface with the local motion planner 705 or the global planner 605, such as to receive the route 410 to navigate.

A navigational action 725 can be taken in by the trajectory follower 720. For example, the vehicle interface 108 can execute a navigational action 725. The navigational action 725 can be or include the conveyance of information. For example, an audible alarm of the vehicle interface 108 can sound (e.g., to alert a pilot associated with the aerial vehicle 205 of the information). The conveyance of information can include displaying information from a GUI 400. For example, any of an indication of the trajectory of the aerial vehicle 205, a recommended action, or an alert level can be depicted. For example, the display on the GUI 400 can be based on a probability of a collision. For example, information associated with a potential collision can be displayed based on a probability of a collision exceeding a probabilistic threshold. The prominence of the display (e.g., visual display on the GUI 400, along with various audible alerts) of the information can be varied according to a probability, severity, or a distance. For example, a potential event several kilometers from a current position can be displayed with a relatively low prominence; a potential event several meters away can be displayed with a relatively high prominence.

The local motion planner 705 can include a flight control setting, such as adjusting a heading, direction, or speed of the aerial vehicle 205. For example, in an autonomous aerial vehicle 205 (e.g., an fully-autonomous aerial vehicle 205 or a semi-autonomous aerial vehicle 205) the local motion planner 705 can adjust the flight of the aircraft to avoid the obstacle 415. The local motion planner 705 can include a determination of another route 410. For example, the route 410 can be based on the avoidance of the obstacle 415 based on local sensor data 126 or the world model 124.

Figure 8:
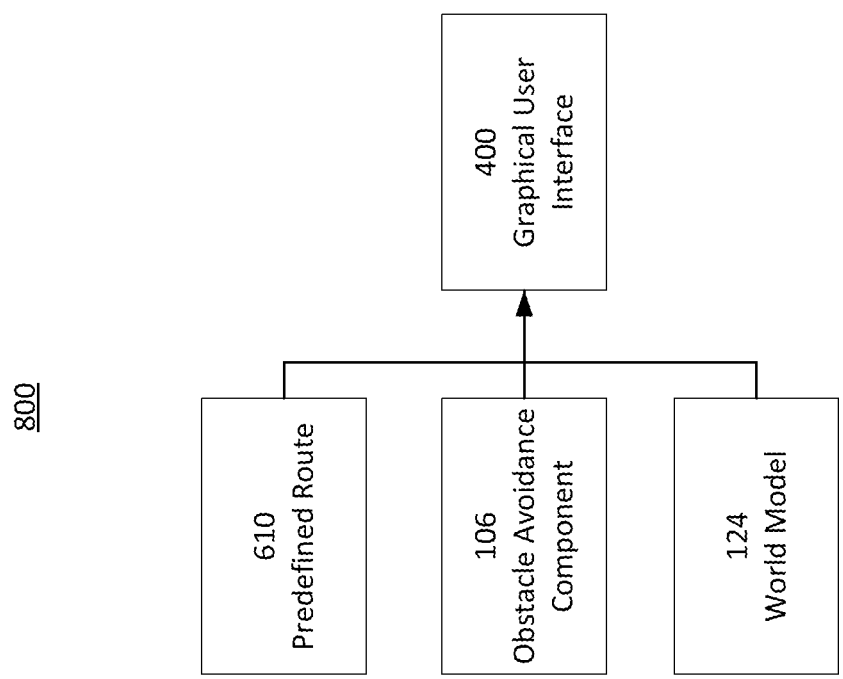
FIG. 8 a block diagram of a system for presentment of information associated with navigation of an aerial vehicle with a slung load is illustrated, in accordance with one or more implementations.

Referring now to FIG. 8 and others, a block diagram 800 for presentment of information associated with navigation of an aerial vehicle 205 with a slung load 210 is illustrated, in accordance with one or more implementations. For example, the presentment of information can be or be included in the navigational action 725 of FIG. 7. The GUI 400 can display information including the predefined route 610. For example, the predefined route 610 can be depicted as a path along a map (e.g., the GUI 400 of FIG. 4), a series of waypoints, or a heading. For example, one or more waypoints, or the direction thereof can be depicted on the display (e.g., overlaid a map, or as a directional indicator). The GUI 400 can also display information received from the obstacle avoidance component 106. For example, a cone 315 or one or more indications of an area of a potential collisions, or information associated with the collision, or a recommended action can be provided. For example, the cone 315 and one or more obstacles 415 can be presented. The GUI 400 can display world model 124 data such as weather data, terrain data, origin data, destination data, etc. The GUI 400 can also display local sensor data 126 (not depicted). The local sensor data 126 can displace or supplement portions of the world model 124. For example, at least a portion of the terrain map can be updated based on local sensor data 126 such as LiDAR data.

Figure 9:
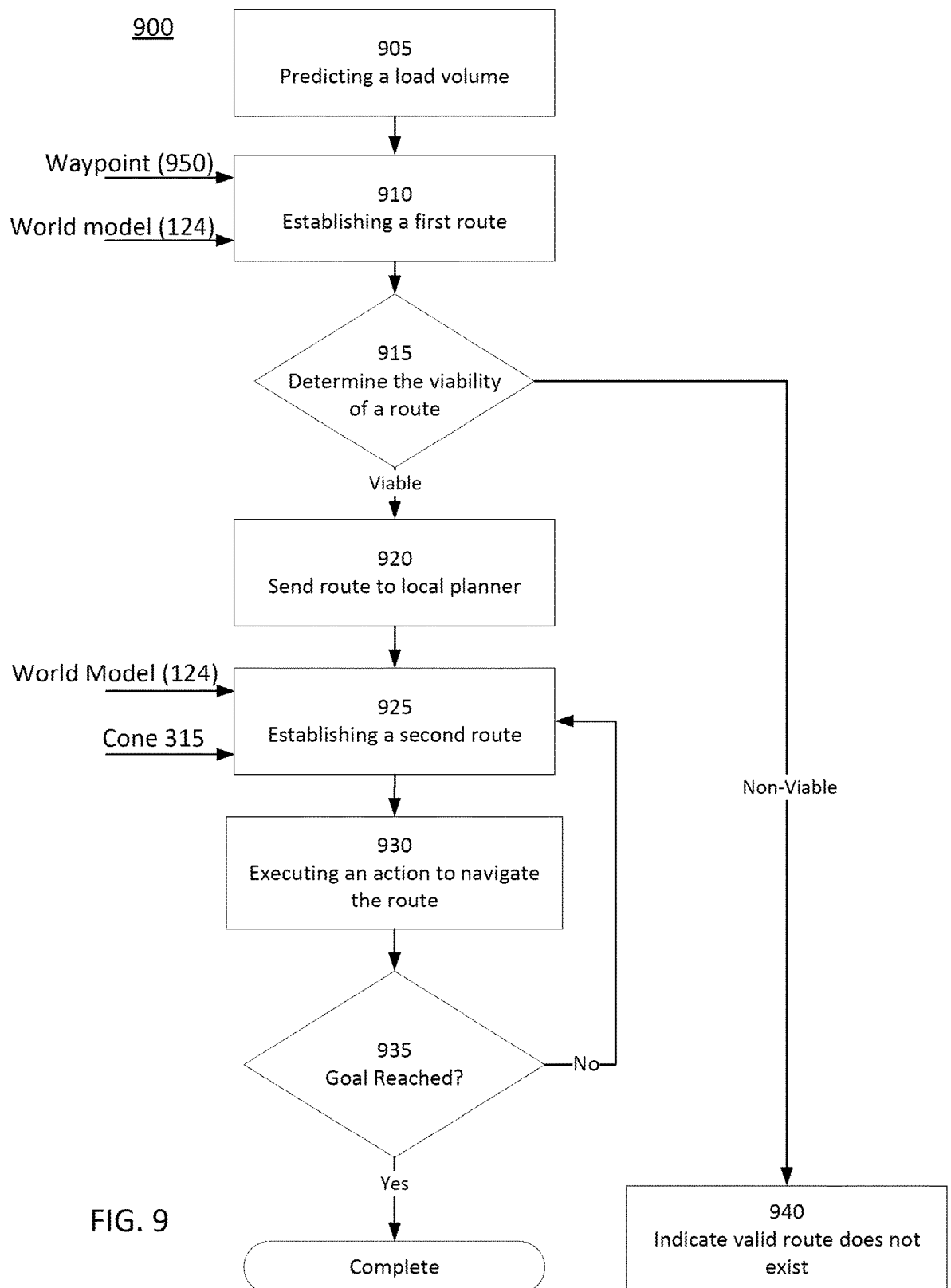
FIG. 9 illustrates another flow diagram of a method for navigation of an aerial vehicle with a slung load, in accordance with one or more implementations.

Referring now to FIG. 9 and others, depicted is an illustrative flow diagram of a method 900 for navigating an aerial vehicle 205 with a slung load 210, in accordance with one or more implementations. The method 900 can be executed, performed, or otherwise carried out by the data processing system 100, the computer system 1000 described herein in conjunction with FIG. 10, or any other computing devices described herein. In brief overview, the method 900 can include predicting a load volume (ACT 905), establishing a first route 410 (ACT 910), determining the viability of a first route 410 (ACT 915), sending the route to a local motion planner 705 (ACT 920), establishing a second route 410, such as a modification from the first route (ACT 925), executing an action to navigate the route 410 (ACT 930), determining a completion of the route 410 (ACT 935), or indicating a valid route 410 does not exist (940).

In further detail, the method 900 can include predicting a cone 315 for a load volume (ACT 905). For example, the load volume predictor 102 can predict the cone 315 based on the world model 124 including load parameters, weather, a terrain map, and the like. The load volume predictor 102 can perform the prediction prior to the lift-off of an aerial vehicle 205, or responsive to detecting one or more load 210 parameters. The load volume predictor 102 can predict the cone 315 subsequent to the lift-off of the aerial vehicle 205. For example, the aerial vehicle 205 can predict cones 315 continuously based on available information such as the world model 124 and local sensor data 126 (e.g., local sensor data 126 associated with an environment or the load 210 during operation of the aerial vehicle 205). The prediction can be conducted at a regular period (e.g., based on a time, a distance traveled, or a progression along the route 410). The prediction can be responsive to a proximity of an obstacle 415 (e.g., an obstacle 415 detected based on the world model 124 or the local sensor data 126). For example, ACT 905 can be performed during or between additional ACTs of the disclosed method 900.

The method 900 can include establishing a first route 410 (ACT 910). The first route 410 can be an initial route 410 generated by the route generator 104, based on the world model 124, various waypoints 950, or the cone 315. For example, ACT 910 can be performed prior or subsequent to ACT 905. The viability of the route 410 can be determined (ACT 915) by the route generator 104 or the obstacle avoidance component 106. For example, the global planner can determine a non-viability of a route and provide an indication of non-viability (e.g., an indication to a pilot or another device in communicative connection.)

The method 900 can include sending the route 410 to a local motion planner 705 (ACT 920). For example, the route 410 can be provided to a local motion planner 705 along with a world model 124 of portions thereof. The local motion planner 705 can provide a heading or other information to a trajectory follower 720 to navigate the route 410. The local motion planner 705 can detect a contention between the world model 124 and a local environment, such as responsive to an the obstacle avoidance component 106, which can detection of one or more obstacles 415 accessible to the obstacle avoidance component 106 (e.g., based on local sensor data 126). For example, an obstacle 415 can be detected by a vision system, a LiDAR system, a position sensor such as a global positioning system (GPS) sensor, or another sensor. The obstacle avoidance component 106 can determine the pass-ability of a route 410 based on environmental data, such as environmental data of the world model 124 or collected by an environmental sensor 110 of the aerial vehicle 205. A route 410 may be determined to be require adjustment based on a combination of weighted factors. For example, based on a combination of a parameter of a slung load 210 (e.g., a weight), a visibility, or a wind speed, the obstacle avoidance component 106 can determine that a probability of a collision exceeds one or more thresholds. The route generator 104 can determine an indication for altering a route 410 based on local sensor data 126 (e.g., a presence of another vehicle), or information of the world model 124 (such as an updated terrain map based on another aerial or non-aerial vehicle), or an additional of a restricted airspace (e.g., exceeding an elevation over ground, or sea-level), or an updated destination or waypoint. The route 410 can be determined to be viable. For example, the viability can be inferred based on no indication of non-viability, or the viability can be determined based on local senor data (e.g., affirming the navigability of an initial route 410).

The method 900 can include establishing a second route 410 (ACT 925). The second route can be an alteration of the first route. The route generator 104 can determine the second route 410 in response to a determination of a need to adjust the first route. For example, the route generator 104 can determine a second route 410 which avoids an obstacle 415 present on the first route 410. The second route 410 can include a change of a path or waypoints, a rate of travel, or other route 410 elements. The route generator 104 can determine the second route 410 based on the world model 124 or local sensor data 126 acquired prior to the detection of a need to adjust the first route 410, incident to the detection of an obstacle 415 of the first route 410, or following the detection of a non-viability of the first route 410.

Upon establishing the second route 410, or determining the viability of the first route 410, the vehicle interface 108 can execute a navigational action 725 to navigate the route 410. (ACT 930) For example, the navigational action 725 can be or include controlling the flight of the aerial vehicle 205 such as adjusting a heading or depicting information relevant to the route 410. The vehicle interface 108 can determine if the route 410 is complete (ACT 935). For example, the vehicle interface 108 can determine a position of the aerial vehicle 205 (e.g., detected by a positional sensor 112), relative to a destination. The vehicle interface 108 can receive a user indication of navigational completion (e.g., through the GUI 400 or an input associated therewith).

Figure 10:
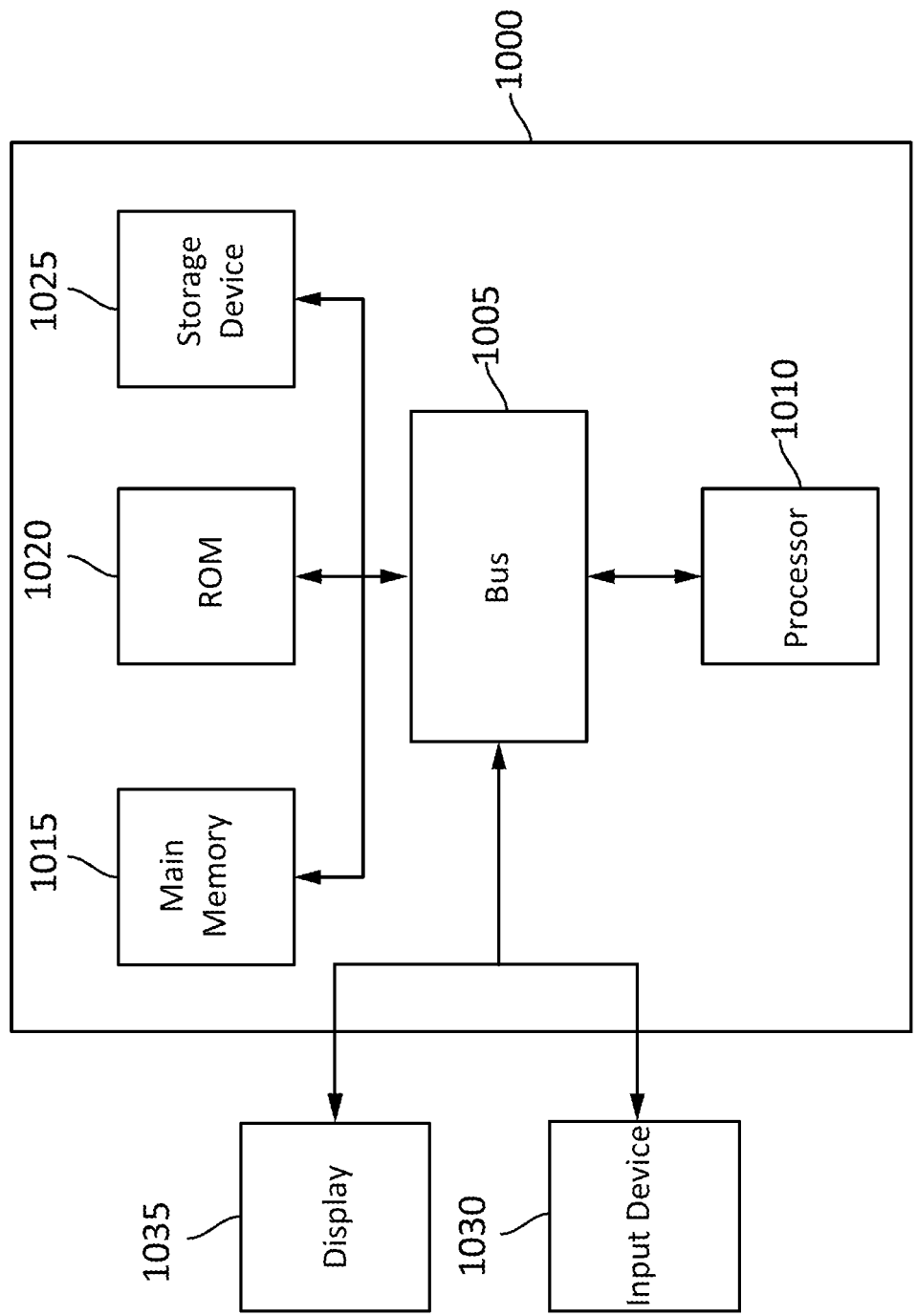
FIG. 10 illustrates a block diagram of an example computer system useful in implementing one or more components detailed herein.

Referring now to FIG. 10, depicted is a block diagram of an example computer system 1000. The computer system or computing device 1000 can include or be used to implement the data processing system 100, or its components. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus 1005 for processing information. The computing system 1000 also includes at least one main memory 1015, such as a random access memory (RAM) or other dynamic storage device, coupled to the bus 1005 for storing information, and instructions to be executed by the processor 1010. The computing system 1000 can further include at least one read only memory (ROM) 1020 or other static storage device coupled to the bus 1005 for storing static information and instructions for the processor 1010. A storage device 1025, such as a solid state device, magnetic disk, or optical disk, can be coupled to the bus 1005 to persistently store information and instructions.

The computing system 1000 can be coupled via the bus 1005 to a display 1035, such as a liquid crystal display, or active matrix display, for displaying information to a user such as an administrator of the data processing system. An input device 1030, such as a keyboard or voice interface can be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035. The display 1035 can be part of the display devices 1035, or other components of FIG. 10.

The processes, systems, and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement can also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components, and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a GPU, or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and/or distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), a GPU, or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only "A," only "B," as well as both "A" and "B." Such references used in conjunction with "comprising" or other open terminology can include additional items.

Where technical features in the drawings, detailed description or any claims are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system, comprising:
one or more processors, coupled with memory, to:
predict, based on one or more parameters of a load slung from an aerial vehicle, a volume to be occupied by the load;
establish, based on a map of a terrain, stored in the memory, and the volume predicted to be occupied by the load slung from the aerial vehicle, a route from a first location to a second location configured to avoid a collision between one or more obstacles in the terrain and the load slung from the aerial vehicle; and
execute an action to navigate the aerial vehicle along the route to avoid the collision between the one or more obstacles in the terrain and the load slung from the aerial vehicle, the action comprising an autonomous navigation of the aerial vehicle along the route.

2. The system of claim 1, comprising:
the one or more processors to identify the one or more parameters comprising a length of a cable from which the load is slung from the aerial vehicle, and dimensions of the load.

3. The system of claim 1, comprising the one or more processors to:
receive data from a machine-readable code captured by a scanning device; and
determine the one or more parameters based on the data of the machine-readable code.

4. The system of claim 1, comprising:
the one or more processors to receive, via a user interface of the aerial vehicle, the one or parameters.

5. The system of claim 1, comprising:
the one or more processors to establish the route with a function that balances a distance of the route with an amount of acceleration of the load slung from the aerial vehicle.

6. The system of claim 1, comprising the one or more processors to:
subsequent to establishment of the route and departure of the aerial vehicle from the first location, obtain data detected by one or more sensors of the aerial vehicle;
predict a second volume for the load slung from the aerial vehicle based on the data; and
modify, responsive to the second volume, the route to generate a second route to the second location.

7. The system of claim 1, comprising the one or more processors to:
establish the route prior to traversal of the route by the aerial vehicle;
detect, from a sensor of the aerial vehicle, a wind speed subsequent to departure of the aerial vehicle from the first location;
predict, based on the wind speed, a second volume for the load slung from the aerial vehicle, the second volume greater than the volume; and
modify, based on the second volume greater than the volume, the route to generate a second route configured to avoid the collision between the one or more obstacles in the terrain and the load slung from the aerial vehicle, the second route longer than the route.

8. The system of claim 1, comprising the one or more processors to:
receive, from a sensor of the aerial vehicle subsequent to departure from the first location and prior to arrival at the second location, a measurement of an angle between an axis that is perpendicular to a bottom of the aerial vehicle and a cable from which the load is slung;
predict, based on the angle, a second volume for the load slung from the aerial vehicle, the second volume less than the volume; and
modify, based on the second volume less than the volume, the route to generate a second route configured to avoid the collision between the one or more obstacles in the terrain and the load slung from the aerial vehicle, the second route shorter than the route.

9. The system of claim 1, comprising:
the one or more processors to execute the action comprising to present, via a graphical user interface on a display device within the aerial vehicle, the route.

10. The system of claim 1, comprising:
the one or more processors to execute the action comprising to navigate, autonomously, the aerial vehicle along the route from the first location to the second location.

11. The system of claim 1, comprising:
a global planner executed by the one or more processors to:
retrieve, from the memory, a world model for the terrain; and
establish, prior to lift-off of the aerial vehicle, the route based on the world model and the volume predicted to be occupied by the load slung from the aerial vehicle; and
a local motion planner executed by the one or more processors to:
receive, from one or more sensors of the aerial vehicle subsequent to lift-off of the aerial vehicle, data corresponding to at least one of an angle of a cable attached to the load, a wind speed, or aircraft motion;
update, based on the data, the volume;
determine, based on the updated volume, a probability of collision between the load and an obstacle in the terrain along the route; and
modify, responsive to the probability of collision greater than or equal to a threshold, the route to reduce the probability of collision to less than the threshold.

12. The system of claim 1, wherein the aerial vehicle comprises a helicopter or an unmanned aerial vehicle.

13. A method, comprising:
predicting, by one or more processors coupled with memory, based on one or more parameters of a load slung from an aerial vehicle, a volume to be occupied by the load;
establishing, by the one or more processors, based on a map of a terrain stored in the memory and the volume predicted to be occupied by the load slung from the aerial vehicle, a route from a first location to a second location configured to avoid a collision between one or more obstacles in the terrain and the load slung from the aerial vehicle; and executing, by the one or more processors, an action to navigate the aerial vehicle along the route to avoid the collision between the one or more obstacles in the terrain and the load slung from the aerial vehicle, the action comprising an autonomous navigation of the aerial vehicle along the route.

14. The method of claim 13, comprising:
identifying, by the one or more processors, the one or more parameters comprising a length of a cable from which the load is slung from the aerial vehicle, and dimensions of the load.

15. The method of claim 13, comprising:
receiving, by the one or more processors, data from a machine-readable code captured by a scanning device; and
determining, by the one or more processors, the one or more parameters based on the data of the machine-readable code.

16. The method of claim 13, comprising:
obtaining, by the one or more processors subsequent to establishing the route and departure of the aerial vehicle from the first location, data detected by one or more sensors of the aerial vehicle;
predicting, by the one or more processors, a second volume for the load slung from the aerial vehicle based on the data; and
modifying, by the one or more processors responsive to the second volume, the route to generate a second route to the second location.

17. The method of claim 13, comprising:
establishing, by the one or more processors, the route prior to traversal of the route by the aerial vehicle;
detecting, by the one or more processors from a sensor of the aerial vehicle, a wind speed subsequent to departure of the aerial vehicle from the first location;
predicting, by the one or more processors based on the wind speed, a second volume for the load slung from the aerial vehicle, the second volume greater than the volume; and
modifying, by the one or more processors based on the second volume greater than the volume, the route to generate a second route configured to avoid the collision between the one or more obstacles in the terrain and the load slung from the aerial vehicle, the second route longer than the route.

18. The method of claim 13, wherein executing the action comprises:
presenting, by the one or more processors, via a graphical user interface on a display device within the aerial vehicle, the route.

19. An aerial vehicle, comprising:
a cable having a first end and a second end opposite the first end, wherein the first end of the cable is coupled to a bottom portion of the aerial vehicle and the second end is coupled to a load that is slung from the aerial vehicle via the cable; and
a flight system comprising one or more processors coupled with memory, the flight system to:
predict, based on one or more parameters of a load slung from the aerial vehicle, a volume to be occupied by the load;
establish, based on a map of a terrain, stored in the memory, and the volume predicted to be occupied by the load slung from the aerial vehicle, a route from a first location to a second location configured to avoid a collision between one or more obstacles in the terrain and the load slung from the aerial vehicle; and
execute an action to navigate the aerial vehicle along the route to avoid the collision between the one or more obstacles in the terrain and the load slung from the aerial vehicle, the action comprising an autonomous navigation of the aerial vehicle along the route.

20. The aerial vehicle of claim 19, wherein the flight system is further configured to:
receive data from a machine-readable code captured by a scanning device; and
determine the one or more parameters based on the data of the machine-readable code.

* * * * *